July 22, 1958
C. J. DANIELS ET AL
2,844,340
WEIGHT ACTUATING ARRESTING CABLE CONTROL
MEANS FOR AIRCRAFT
Filed Oct. 16, 1956
2 Sheets-Sheet 1
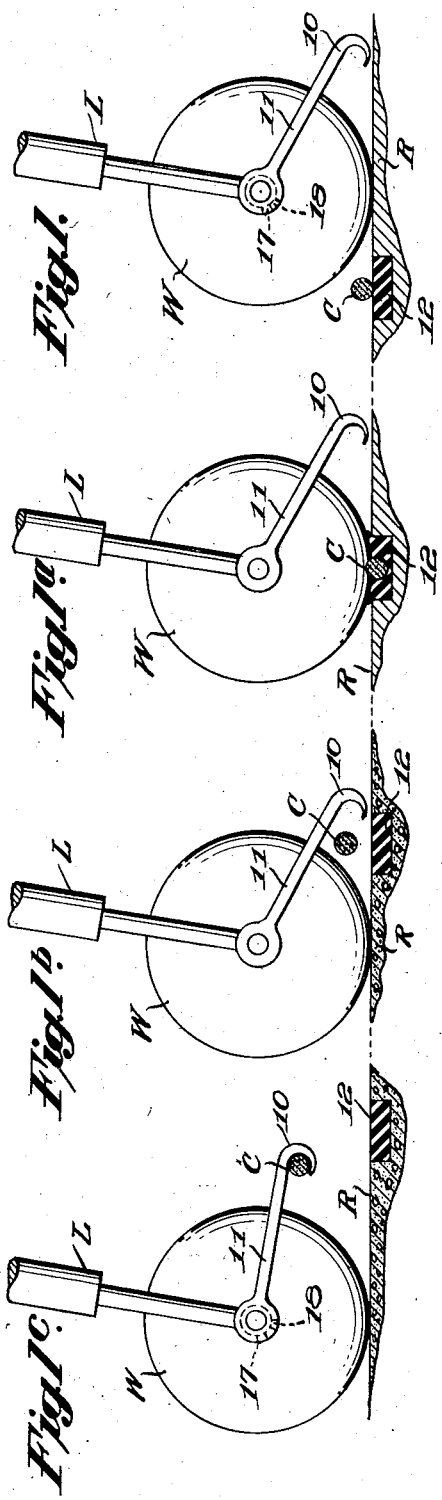
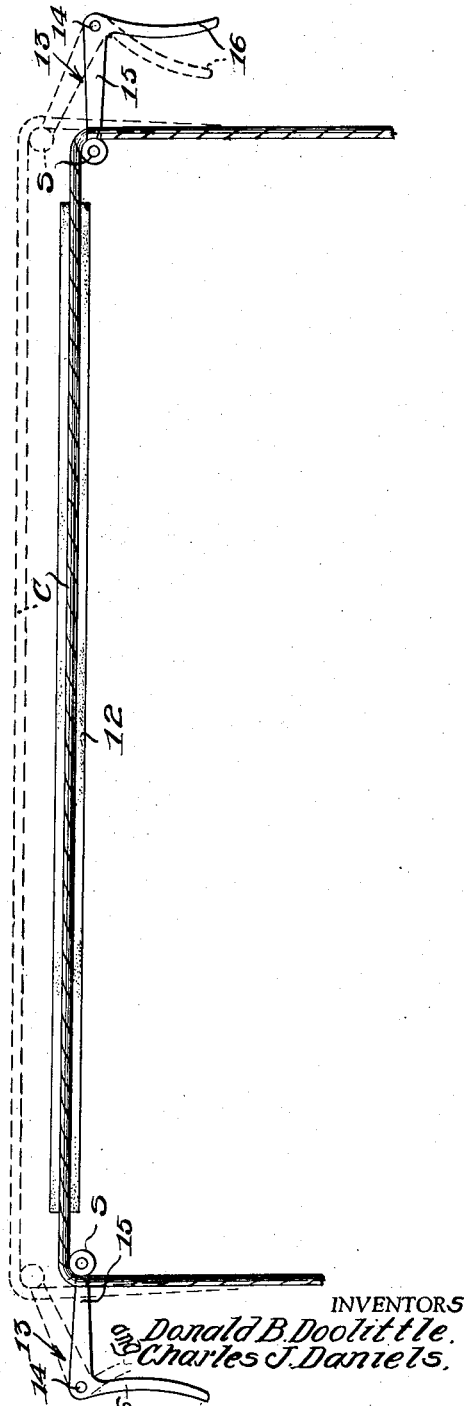
INVENTORS
Donald B. Doolittle.
Charles J. Daniels.
BY Herbert M. Birch
ATTORNEY July 22, 1958  C. J. DANIELS ET AL  2,844,340
WEIGHT ACTUATING ARRESTING CABLE CONTROL
MEANS FOR AIRCRAFT
Filed Oct. 16, 1956  2 Sheets-Sheet 2
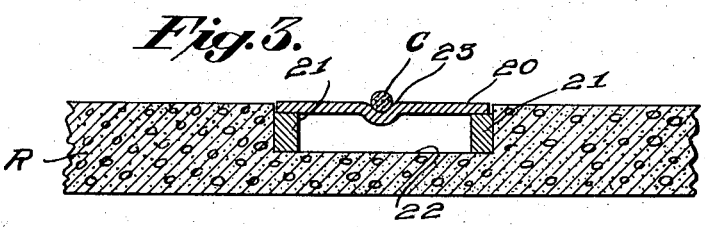
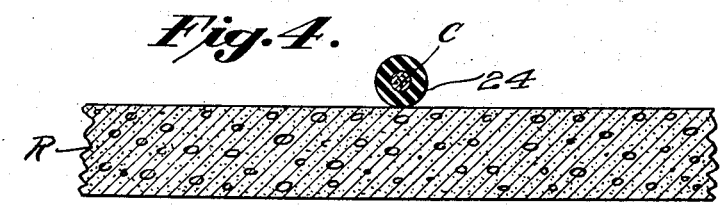
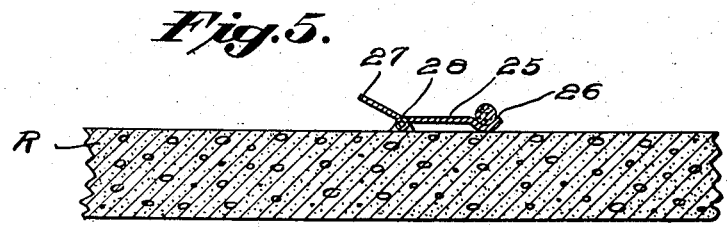
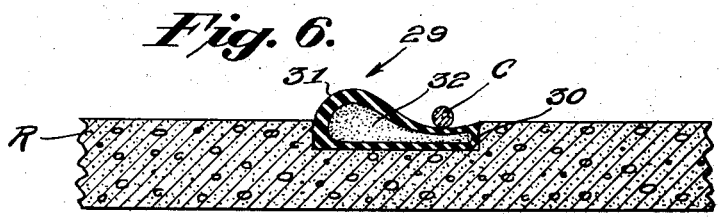
INVENTORS
Donald B. Doolittle
Charles J. Daniels
BY Herbert M. Birch
ATTORNEY United States Patent Office 2,844,340
Patented July 22, 1958

2,844,340

WEIGHT ACTUATED ARRESTING CABLE CONTROL MEANS FOR AIRCRAFT

Charles J. Daniels and Donald B. Doolittle, Wilmington, Del., assignors to All American Engineering Company, Wilmington, Del., a corporation of Delaware Application October 16, 1956, Serial No. 616,329

9 Claims. (Cl. 244—110)

This invention relates to weight actuated cable control means, and more particularly to a weight responsive means adapted to catapult a prone arresting cable upward to an arresting position. The invention is more generally concerned with novel means adapted to support a cable in a prone position for passage of wheels, skids and like thereover, and wherein said means are yieldably responsive to the weight of the mobile object, whereby upon release of pressure of the object's weight as it passes thereover said means quickly assume normal position with a resulting upward movement of the cable into position for engagement with hooks or the like projecting from the undercarriage of the mobile object, such as an aircraft, automobile, test sled or the like.

In the arresting or deceleration of aircraft, it has heretofore been the general practice to provide the aircraft with hooks for engaging an intermediate length of arresting cable laid on the runway transversely thereof and with the ends of the cable connected to suitable arresting engines disposed adjacent opposite sides of the runway.

Since it is necessary for the hooks to engage the cable from the under side thereof, it has heretofore been the practice to yieldably support the cable above the surface of the runway. However, the hooks as heretofore provided were free to engage the ground or runway surface and the same often attained a bouncing action with the result that same sometimes bounced over the cable and failed to engage the same.

It is accordingly a primary object of this invention to provide a support for the cable disposed transversely of the runway, which is responsive to the weight of the vehicle passing thereover, such as the wheels of the vehicle, to thereby project the cable upwardly into the path of a hook or hooks supported by the vehicle, said hook or hooks being out of contact with the runway for avoiding a bouncing action thereof, whereby the cable is engaged by the hooks with certainty.

A further object of the invention is to provide a cable support disposed transversely of a runway, comprising a resilient member deformable under weight of aircraft wheels or skids passing over the same, whereby said resilient member in assuming its normal form after passage of the wheels or skids thereover catapults the cable supported thereby into a position for engagement by hooks disposed rearwardly of said wheels and pivotally supported thereby.

A still further object of the invention is the provision of an aircraft traversing and cable supporting member comprising a lever means, one edge of which supports a cable and the other edge of which through engagement therewith of the wheels of an aircraft moves the first edge upwardly, whereby the cable is catapulted to a position for engagement by hooks depending from the aircraft.

A still further object of the invention is the provision of arresting cable engaging hooks each comprising a shank and free hook end pivotally connected to a vehicle undercarriage adjacent a wheel thereof, wherein the pivotal movement of said shank is limited, whereby the hooks are maintained out of contact with a runway to avoid bouncing thereof.

Other objects and advantages of the invention will become apparent in the course of the following detailed description, wherein:

Figs. 1, 1ª, 1ᵇ and 1ᶜ each disclose a fragmental elevational view of a rear aircraft landing gear on a vertical sectional portion of a runway and wherein the invention in accordance with one structural embodiment thereof is shown in elevation on the landing gear and in vertical section on the runway and the landing gear being shown in successive stages of operation in the respective Figs. 1 to 1ᶜ.

Fig. 2 is a top plan view of means for rendering a cable alternately operative and inoperative.

Fig. 3 is a fragmental longitudinal vertical sectional view of a runway showing a second embodiment of the invention in transverse vertical section.

Fig. 4 is a view similar to Fig. 3 showing a still further embodiment of the invention.

Fig. 5 is a view similar to Fig. 3 showing a still further embodiment of the invention.

Fig. 6 is a view similar to Fig. 3 and showing a still further embodiment of the invention.

Referring now to the drawings in detail and first to Fig. 1 thereof, a portion of an aircraft landing gear is indicated at L, which as known supports a pair of axially spaced wheels, one of which is indicated at W. The landing gear L is provided with an arresting cable engaging hook 10 at one end of a shank 11, whose opposite end is pivotally supported by the landing gear L in axial relation to the wheel W, supported thereby, and wherein the hook shank 11 extends rearwardly of the wheel W as indicated. While only one hook 10 is disclosed, the landing gear may be provided with a pair of hooks, one for each wheel W supported by the landing gear.

A surface or runway R is fragmentally indicated in longitudinal section and on which the wheels W roll in the arresting of a vehicle thereon which may be a landing aircraft. The principal feature of the present invention is operatively associated with the runway R and in the embodiment of Figs. 1 to 1ᶜ comprises a resilient strip 12, of rubber or like material, which is embedded in the runway R and is disposed transversely thereof, the upper face of the strip being substantially flush with the surface of the runway as indicated in Fig. 1. The said resilient strip 12 is adapted to support an arresting cable C, as indicated in Figs. 1 and 2, and which cable in established practice extends around sheaves S adjacent opposite sides of the runway with the opposite ends of the cable operatively connected to engines as disclosed for example in Patent No. 2,731,219, issued January 17, 1956.

In Fig. 2, the cable C is shown in operative position similarly to Fig. 1 with means provided for moving the cable to an inoperative position or vice versa, which may for example comprise a bell-crank lever 13 adjacent each side of the runway and suitably pivoted thereto as at 14, each lever including an arm 15 on whose free end is rotatably supported one of the sheaves S and a second operating arm 16, whereby the cable C is capable of being moved to either the operative solid line position or the inoperative dotted line position.

The hook shanks 11 are preferably supported on the landing gear L, whereby the same while having a swinging movement about the axes of wheels W are limited in their downward movement so the hooks 10 do not engage the surface of the runway R and consequently are not subjected to any bouncing action.

A suitable means for effecting the above-noted movement of the hook shanks are cooperating stops 17 and 18 on the landing gear L and the hook shank 11, respectively. Thus, as indicated in Fig. 1 the stops 17 and 18 are in contact, whereby the hook 10 is maintained in slight vertical spaced relation to the surface of the runway R, while in Fig. 1ᶜ wherein the shank 11 has moved upwardly, the stops 17 and 18 are in spaced relation.

In operation of the structure described and with the arresting cable C disposed in operative position upon the resilient strip or pad 12 the landing gear L in Fig. 1 is approaching the cable C with the wheels W rolling on the surface R. Upon the wheels W passing over the resilient strip 12 as in Fig. 1ᵃ the cable C is forced downwardly under weight of the vehicle or aircraft being arrested with a resulting compression and deformation of the strip. When the wheels W have passed over the resilient strip 12, as in Fig. 1ᵇ, the strip 12 quickly resumes its initial form with a resulting catapulting of the cable to a position above the path of the advancing hook or hooks 10 and upon further rotation of the wheels W to the position in Fig. 1ᶜ the hook or hooks 10 will grasp the cable C and the aircraft will be subjected to an arresting action.

When it is desired to render the arresting cable inoperative the levers 13 are swung on their pivots 14, whereby the cable is disposed in a position off the resilient strip 12 as indicated by dotted lines in Fig. 2. The resilient strip 12 and hooks 10 may be so relatively configured that hook engagement with the cable will occur only above a predetermined speed and which would result in a situation where aircraft could taxi over the arresting cable up to said predetermined speed without engaging the arresting cable. Furthermore, the structure disclosed is capable of use as a safety device wherein cable engagement would not result at normal operating speed but would in the event that runaway or excessive speeds were attained.

The operation of the structure as above disclosed is due to the known fact that a resilient deformable member when subjected to slow distortion will slowly resume its normal undistorted form without complete movement of the member, whereas upon subjecting the member to rapid distortion it will quickly rebound and the entire member as a result of such rebounding action will move from its initial position of rest.

In Figs. 3 to 6 inclusive are disclosed modified embodiments of the invention. The structure according to Fig. 3 embodies a spring metal band or plate 20 whose opposite edges rest upon sills 21, which are disposed within a channel 22 disposed transversely of the runway R. The spring 20 is provided centrally thereof with a depression 23 in which the cable C normally rests. In operation of this modified structure, the band 20 will be downwardly deformed upon engagement of the wheels W therewith and upon the wheels leaving the band the same will spring back into normal position with a resulting catapulting of the cable C into a position for engagement by the hook or hooks 10.

The modified structure according to Fig. 4 comprises a resilient coating or shield 24 for the cable C which coating is preferably rubber as indicated. In operation of this structure the coating 24 upon engagement of wheels W therewith will be deformed and upon release of the deforming pressure, the coating will resume its normal tubular form with a resulting catapulting of the cable C and coating 24 to a position for engagement by the hook or hooks 10 which may be somewhat larger than those disclosed in Figs. 1 to 1ᶜ for receiving the coating 24.

The structure according to Fig. 5 does not embody a deformable resilient member as in the preceding embodiments but comprises a lever-type cable holder and which as shown comprises a plate 25 disposed transversely of the runway R and one edge of which is provided with a depression 26 for normally receiving the cable C. The plate 25 at its opposite edge is provided with an angular extension plate 27 and the plate 25 and extension 27 at their juncture are pivotally connected as at 28 to the runway R. Thus the plate and plate extension provide a lever-type catapulting member for upward projection of the cable C upon passage of the wheels W over same for engagement of the hook or hooks 10 therewith.

The embodiment according to Fig. 6 comprises a resilient pad 29 seated in a channel 30 in the runway R and such pad as shown is of a depth substantially equal to that of the channel 30 at the advance side thereof and the pad gradually thickens upward toward the opposite side thereof with a resulting projection 31 disposed above the surface of the runway R. As indicated in Fig. 6 the upper exposed surface of the pad 29 at its advance edge is concave for seating of the cable C thereon and the surface is convex from said concave portion to the opposite edge of the pad. The pad is preferably provided with air voids 32 for rendering same more resilient. In operation of this structure pressure of the wheels W on the projection 31 will result in upward movement of the normally shallow advance edge of the pad with a resulting catapulting of the cable C into the range of the hook or hooks 10.

From the above description, it will be apparent that the structure in accordance with the present invention provides a means whereby the arresting cable is engaged by aircraft supported hooks with certainty and that the runway traversing portion of the cable is readily moved to and from an operative position for the purpose set forth.

Having set forth our invention in accordance with certain specific structural embodiments thereof, what we claim and desire to secure by U. S. Letters Patent is:

1. In combination with a runway and an aircraft having a landing gear provided with an arresting cable engaging hook pivotally secured thereto, a hook engageable arresting cable loosely disposed transversely of said runway, and elongated deformable resilient means disposed between said runway and said cable and extending transversely of the runway in continuous supporting relation to the cable, whereby upon said landing gear passing over said cable and said deformable resilient means, the latter is initially distorted and immediately thereafter resumes its undistorted form with a resulting reaction thereof and an upward catapulting of said cable into the path of said hook.

2. The structure according to claim 1, wherein said runway is provided with a channel, and said deformable resilient means being disposed in said channel, said deformable resilient means having at least one edge thereof flush with said runway.

3. The structure according to claim 1, wherein said deformable resilient means comprises an elongated strip of rubber.

4. The structure according to claim 1, wherein said deformable resilient means comprises a spring metal band having opposite edges thereof supported at opposite sides of a channel in said surface and above the bottom wall thereof.

5. The structure according to claim 1, wherein said deformable resilient means comprises a resilient jacket surrounding said cable.

6. The structure according to claim 1, wherein said deformable resilient means comprises an elongated resilient member having air pockets therein.

7. In combination with a runway and an aircraft having a landing gear, a deformable resilient support disposed transversely of said runway, an aircraft engageable arresting cable disposed on said support and in continuous contact with same throughout its length, said support being initially distorted upon said landing gear passing over said cable and being resiliently returnable to its undistorted form after passage of the aircraft over the same with a resulting vertical catapulting of said cable, and at least one cable engaging hook pivotally connected to said aircraft out of engagement with said runway in all positions thereof.

8. In combination with a runway and an aircraft having a landing gear provided with an arresting cable engaging hook pivotally secured thereto, said runway being provided with a channel extending transversely thereof, a deformable resilient support disposed within said channel, and a hook engageable arresting cable loosely disposed on said support, whereby upon said landing gear passing over said cable and said support, the latter is initially distorted and immediately thereafter resumes its undistorted form with a resulting reaction thereof and an upward catapulting of said cable into the path of said hook.

9. The structure according to claim 8, wherein said hook is pivotally connected with said landing gear by means limiting the hook in its pivotal movement to a position out of contact with said runway.

References Cited in the file of this patent

UNITED STATES PATENTS

| | | |
|---|---|---|
| 1,315,320 | Mesurier | Sept. 9, 1919 |
| 2,583,125 | Shannon | Jan. 22, 1952 |

FOREIGN PATENTS

| | | |
|---|---|---|
| 708,172 | Germany | July 14, 1941 |